W. SEWELL & A. S. CAMERON.
PUMP VALVE.
No. 42,693.
PATENTED MAY 10, 1864.
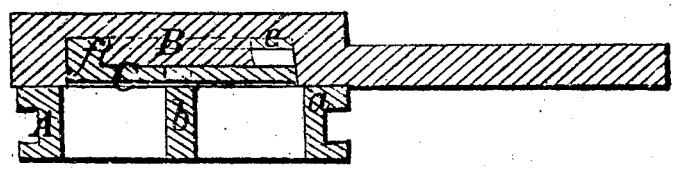
TAKEN FROM PATENT OFFICE REPORT
1864 VOL. II.
ONLY DRAWING ACCESSIBLE (1911)

UNITED STATES PATENT OFFICE.

WILLIAM SEWELL AND ADAM S. CAMERON, OF NEW YORK, N. Y.

IMPROVEMENT IN PUMP-VALVES.

Specification forming part of Letters Patent No. 42,693, dated May 10, 1864.

*To all whom it may concern:*

Be it known that we, WILLIAM SEWELL and ADAM S. CAMERON, both of the city, county, and State of New York, have invented a new and useful Improvement in India-Rubber and other Gum Valves for Pumps and other Purposes; and we do hereby declare that the following is a full, clear, and exact description of the same, reference being had to the accompanying drawings, forming a part of this specification, in which—

Figure 1 is a central section of a valve and its seat. Fig. 2 is a plan of the valve-seat. Fig. 3 is an inverted plan of the valve, showing also in red outline a plan of the seat. Fig. 4 is an inverted plan of the metal disk which is inserted into the valve. Fig. 5 is a side or edge view of the said disk.

Similar letters of reference indicate corresponding parts in the several figures.

The object of our invention is to combine in one valve all the advantages of a valve made wholly of india rubber or other gum and those of a valve made wholly of metal, without the disadvantages of either.

Valves made wholly of india-rubber or gum, though very effective when new, are liable to the objection that they are forced down through the openings of their seats by the pressure to which they are subject in use in such manner that when the pressure is considerable they are cut or worn out in a short space of time.

Valves made wholly of metal, though capable of resisting the pressure to which they are subject when closed, are liable to the following objections, viz: First, it requires great care and nice workmanship to make them perfectly tight in the first instance; second, it is impossible to keep them tight when the fluid passing through contains grit or dirt, which might lodge between the faces of the valves and their seats and prevent them from closing perfectly; third, they are noisy in their operation, which is a serious objection in certain situations—for instance, as in a pump in a hotel or passenger steam-vessel; fourth, by the hammer-like action with which they come in contact with their seats their own faces, and those of their seats are soon so battered or worn as to impair their closeness or tightness of fit.

With a view to obviate the above-mentioned objections to the valves made wholly of india-rubber or gum, and to those made wholly of metal, and retain the tight fitting property and noiselessness of the india-rubber or gum and the resisting property of metal, our invention consists in making an india-rubber or other gum valve with a disk of metal or other hard stiff material, which, when the valve is closed and subject to a certain degree of pressure, comes in contact with a portion of the valve-seat and prevents any further depression of the gum below or beyond the edges of the opening of the seat.

To enable those skilled in the art to construct our invention and apply it to use, we will proceed to describe it with reference to the drawings.

A is the metal valve-seat, having an annular face, $a$, and having arranged within and across the said face a guard, $b$, the surface of which is slightly below the face $a$, as shown in Fig. 1. B is the valve, made of vulcanized india-rubber of a form to fit the seat A, and having securely inserted into its face the disk C of brass or other metal or hard material, the diameter of which is somewhat smaller than that of the inner circle of the annular face $a$ of the seat, and the face of which is slightly recessed within the surrounding portion $d$ of the face of the valve, which closes upon the said face $a$, so that when the valve closes the said portion $d$ may first come into contact with the face $a$ and close tightly thereon, and the continued pressure upon the back of the valve may bring the disk C into contact with the guard $b$, and prevent the further depression of the india-rubber below or beyond the inner circular edge of the face $a$.

The disk C may be inserted and secured in the india-rubber valve in various ways, but the best way is after facing in a lathe or by other means to insert it in a mold in which the valve is to be formed, preparatory to the introduction thereinto of the india-rubber prepared for vulcanization, and so secure it therein by the vulcanizing process. The said disk may have its back part formed in various ways to secure it in the india-rubber; but we prefer to cast it with a ring, $e$, attached by radial wings or feathers, $f\!f$, which, with the ring and the circumference of the disk itself, will be entirely surrounded by and embedded within the india-rubber.

We do not confine ourselves to any particular form of the valve, disk, and seat, but

What we claim as our invention, and desire to secure by Letters Patent, is—

Providing or making an india-rubber or other gum-valve with a disk of metal or other hard material adapted, by coming in contact with the valve-seat or with a suitable guard, to limit or prevent the forcing of the gum into the aperture of the seat, substantially as herein described.

WILLIAM SEWELL.
ADAM S. CAMERON.

Witnesses:
M. M. LIVINGSTON,
HENRY MORRIS.